(12) United States Patent
Bambharoliya et al.

(10) Patent No.: US 11,983,181 B1
(45) Date of Patent: May 14, 2024

(54) DATA STREAM PROCESSING INSTRUCTION SET PREVIEWS USING BATCH CONVERSION

(71) Applicant: Splunk Inc., San Francisco, CA (US)

(72) Inventors: Ankur Dalsukhbhai Bambharoliya, Bellevue, WA (US); Ricky Burnett, Davis, CA (US); Daniel Ferstay, Vancouver (CA); Arthur Foelsche, Montpelier, VT (US); Alexander D. James, Sammamish, WA (US); Ganesh Jothikumar, Los Altos, CA (US); Bei Li, Redwood City, CA (US); Amy Joanna Sutedja, Seattle, WA (US); Salih Ammar Wajih Zainulabdeen, Seattle, WA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/816,322

(22) Filed: Jul. 29, 2022

Related U.S. Application Data

(60) Provisional application No. 63/366,234, filed on Jun. 10, 2022.

(51) Int. Cl.
*G06F 16/00* (2019.01)
*G06F 16/2455* (2019.01)
*G06F 16/2457* (2019.01)
*G06F 16/248* (2019.01)

(52) U.S. Cl.
CPC .. *G06F 16/24568* (2019.01); *G06F 16/24573* (2019.01); *G06F 16/248* (2019.01)

(58) Field of Classification Search
CPC ......... G06F 16/24568; G06F 16/24573; G06F 16/248

USPC .................................................. 707/600–899
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,578,261 B1 * | 11/2013 | Gupta | G06F 16/957 715/208 |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Michelle N Owyang
(74) *Attorney, Agent, or Firm* — Knobbe, Martens, Olson & Bear, LLP

(57) ABSTRACT

Systems and methods are described for providing previews of deployment of data stream processing instructions sets, sometimes called pipelines, to a stream data processing system. Rather than deploying such an instruction set, which may cause detrimental side effects, previews can be facilitated by conversion of a data stream processing instructions set to a batch query that is applied to an existing data set. An output of the batch query can then be provided to an end user as a preview of output of the data stream processing instructions set, when implemented.

19 Claims, 10 Drawing Sheets

(56) References Cited

U.S. PATENT DOCUMENTS

| | | | |
|---|---|---|---|
| 10,127,258 B2 | 11/2018 | Lamas et al. | |
| 11,714,812 B2 * | 8/2023 | Kancharla | G06F 16/2379 |
| | | | 707/714 |
| 2019/0098106 A1 | 3/2019 | Mungel et al. | |
| 2021/0176335 A1 * | 6/2021 | Geerinck | H04L 67/567 |
| 2021/0191925 A1 * | 6/2021 | Sianez | G06N 20/00 |
| 2021/0349950 A1 * | 11/2021 | Setlur | G06F 40/274 |
| 2022/0138205 A1 * | 5/2022 | Lei | G06F 16/24573 |
| | | | 707/769 |
| 2023/0023655 A1 * | 1/2023 | Hui | G06F 3/04817 |

OTHER PUBLICATIONS

Carraso, David, "Exploring Splunk," published by CITO Research, New York, NY, Apr. 2012.

SLAML 10 Reports, Workshop On Managing Systems via Log Analysis and Machine Learning Techniques. ;login: Feb. 2011—Conference Reports—vol. 36, No. 1, pp. 104-110.

Splunk Enterprise Overview 8.0.0—splunk > turn data into doing—copyright 2020 Splunk Inc.—in 17 pages—Retrieved from Splunk Documentation <URL: https://docs.splunk.com/Documentation> on May 20, 2020.

Splunk Cloud User Manual 8.0.2004—splunk> turn data in doing—copyright 2020 Splunk Inc.—in 66 pages—Retrieved from Splunk Documentation <URL: https://docs.splunk.com/Documentation> on May 20, 2020.

Splunk Quick Reference Guide, updated 2019, available online at https://www.splunk.com/pdfs/solution-guides/splunk-quick-reference-guide.pdf, retrieved May 20, 2020.

* cited by examiner

DATA STREAM PROCESSING INSTRUCTION SET PREVIEWS USING BATCH CONVERSION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks).

During operation, computing devices can generate large amounts of data, such as logs, metrics, and the like. It can be difficult to efficiently and effectively process and search such data, particularly as the amount of data grows large.

BRIEF DESCRIPTION OF THE DRAWINGS

Illustrative examples are described in detail below with reference to the following figures.

DETAILED DESCRIPTION

Figure 1:
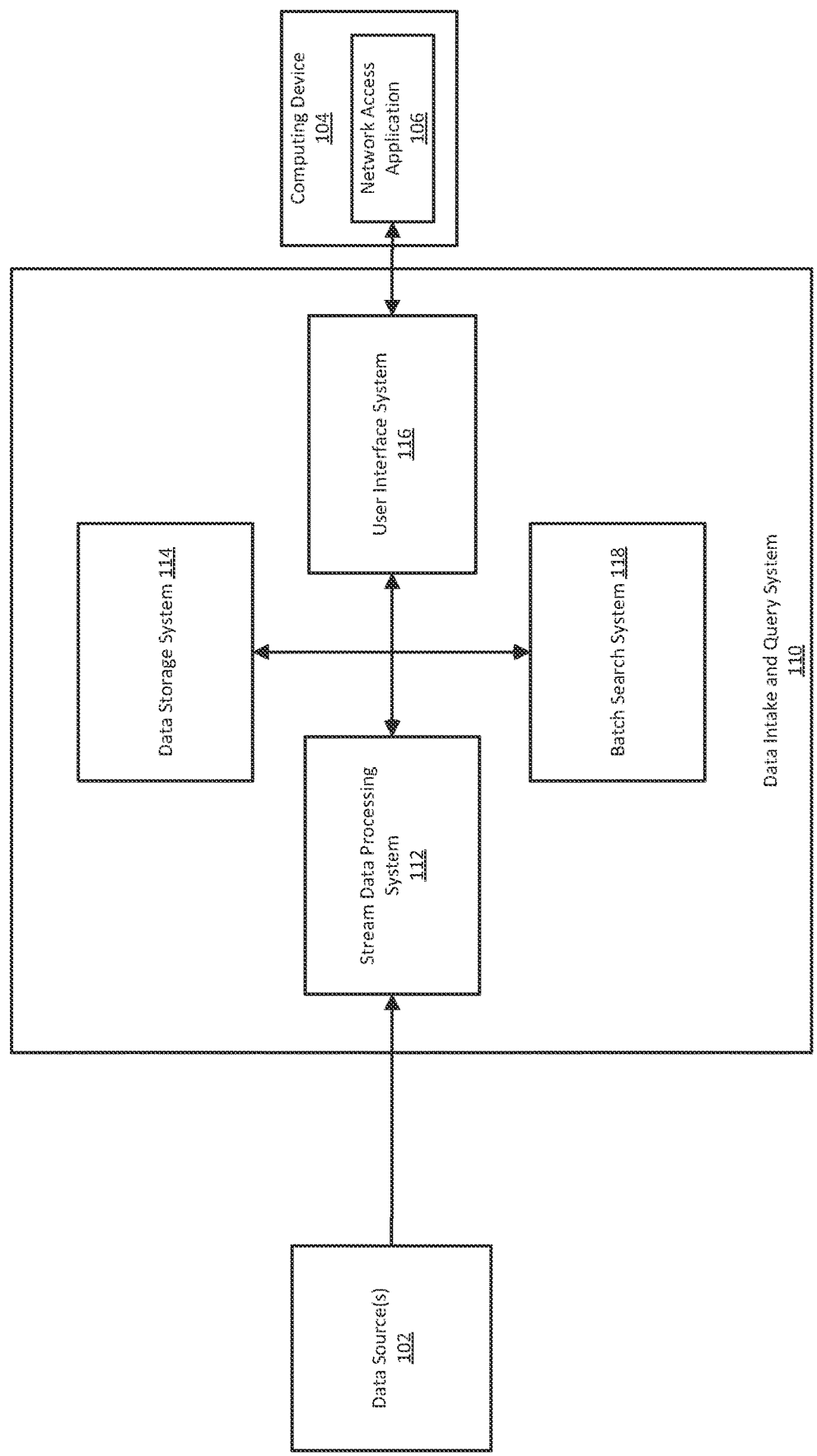
FIG. 1 depicts an illustrative operating environment in which previews of data stream processing instruction sets are provided by conversion of the instruction sets to batch queries.

Generally described, aspects of the present disclosure relate to providing previews for processing occurring via a data stream processing instruction set, sometimes referred to as a pipeline. More specifically, aspects of the present disclosure relate to providing previews for data stream processing instruction sets by converting such instruction sets to batch queries that can be applied to an existing data set. As disclosed herein, an end user may author a data stream processing instruction set to be deployed to a stream data processing system. A data stream processing instruction set can illustratively configure the stream data processing system to obtain data from an input data stream (also referred to as a "source" stream), manipulate the data according to one or more manipulations (e.g., filtering the data, transforming the data, routing the data, or the like), and write the data to an output data stream (also referred to as a "sink" stream). Prior to deploying the data stream processing instruction set, the user may desire to preview operation of the data stream processing instruction set, such as to ensure the data stream processing instruction set operates as desired. In accordance with embodiments of the present disclosure, such preview can be achieved without requiring reading from a source stream or writing to a sink stream, and thus without negatively impacting such streams. Specifically, such preview can be achieved by converting the data stream processing instruction set into a batch query and applying the batch query to an existing data set representative of data within the source stream, enabling an end user to view results of the data stream processing instruction set when implemented and thus preview operation of the data stream processing instruction set.

One potential mechanism for previewing operation of a data stream processing instruction set is to simply deploy the data stream processing instruction set with respect to a source stream. For example, a stream data processing system may read from a source stream, transform data from the source stream according to the data stream processing instruction set, and provide a user with output of the data stream processing instruction set as a preview of the data stream processing instruction set's operation. This approach can be problematic for a variety of reasons. For example, many stream data processing systems operate with respect to a cursor that denotes a current location of the system with respect to a source stream. Because this direct deployment approach reads from a source stream, that cursor may be moved forward, causing read data to be marked as processed. If the preview is unsuccessful, it may be difficult or impossible to revert to a prior location in the stream. For example, the cursor may be enforced by the stream itself (e.g., by monitoring reads of data by downstream sources), and thus not directly modifiable by the stream data processing system. Moreover, such an approach causes difficulties with respect to output. In one case, the stream data processing system may inhibit writing to a sink stream during preview, to prevent unwanted output. However, this again entails re-processing the data when the data stream processing instruction set is finally deployed. In another case, the stream data processing system may output processed data to a sink stream during preview. However, this may cause incorrect output to the sink stream if the data stream processing instruction set is not correctly configured. While it may be possible to address these issues using various caching mechanisms, such as caching read data from a source stream at the stream data processing system and re-playing the data during successive previews, these mechanisms require increased complexity at the stream data processing system and are typically limited. For example, even using caching, only a fixed amount of data may be storable at the stream data processing system using such a cache, limiting preview operation. Still further, previews using direct deployment can suffer from interference from other processing. For example, different systems may be operating with respect to source and sink streams, causing previews based on reading from and writing to such streams to be inconsistent, inhibiting instruction set development. Accordingly, previews using direct deployment of data stream processing instruction sets to source and sink streams can be problematic.

Embodiments of the present disclosure address these and other problems by providing for previews of data stream processing instruction sets by conversion of a data stream processing instruction set to a batch query that can be applied to an existing data set. As disclosed herein, when preview of a data stream processing instruction set is desired, a data processing system can convert the data stream processing instruction set into a batch query that logically represents the same data manipulations specified within the data stream processing instruction set. The batch query can then be applied to an existing data set, such as sample data representative of data within a source for the data stream processing instruction set. Results of the batch query can then be presented to an end user as a preview of the data stream processing instruction set. Accordingly, the end user can be provided with a preview of the data stream processing instruction set's operation without modification or interaction with source or sink streams. As a result, the problems associated with preview by direct application of a data stream processing instruction set to source or sink streams are overcome.

In one example, a data processing system can provide a unified query language for specification of both data stream processing instruction sets and batch queries. Each statement may specify a data source (e.g., a stream in the case of data stream processing instruction sets, a set in the case of batch queries) and one or more manipulations of the data from the source. For example, a batch query may be in the form of "$results=from $source I eval field=<expr>", where:
 "$results" is a variable identifying a result data set,
 "from" indicates a data source,
 "$source" is a variable that can be addressed to a source data set,
 the pipe character indicates that data from the source is to be passed to a next operation, and
 "eval field=<expr>" manipulates the data from the $source data set by adding a new field (called, in this example, "field") with the value of that field set to the result of evaluating the <expr> and then outputs a result to the $results data set.
In the case of a data stream processing instruction set, the query statement can further specify a data sink. For example, a data stream processing instruction set may be in the form of "$pipeline=from $source I eval field=<expr>I into $results", where:
 "$pipeline" identifies the data stream processing instruction set,
 "from" indicates a data source,
 "$source" is a variable that can be addressed to a source data stream,
 the pipe character indicates that data from the source is to be passed to a next operation,
 "eval field=<expr>" manipulates the data from the $source data set by adding a new field (called, in this example, "field") with the value of that field set to the result of evaluating the <expr> and then outputs a result to the $results data set,
 "into" identifies a sink data stream, and
 "$results" is a variable that can be addressed to a sink data stream.

As discussed herein, conversion of a data stream processing instruction set into a batch query may include manipulation of such queries, generating one or more batch queries in the unified query language from one or more data stream processing instruction sets in the unified query language.

In one embodiment, preview may occur at the explicit request of an end user. For example, a data processing system may include a "preview" operation to request preview of an authored data stream processing instruction set. In another embodiment, preview may occur implicitly, such as by detection that either or both a source or destination data stream variable within a data stream processing instruction set is unbound, or that a source data stream variable is bound to a data set. For example, when authoring a data stream processing instruction set that reads from the "$source" variable, the data processing system may enable an end user to request preview of a data stream processing instruction set by leaving either or both the $source or the $destination variable unbound. The end user can optionally also set the $source variable to refer to sample data. The data processing system may interpret such actions as a request to preview the data stream processing instruction set, and as such may convert the data stream processing instruction set into a batch query, execute the batch query, and provide results of such execution to the end user as a preview of the data stream processing instruction set. This interaction can enable intuitive data stream processing instruction set development by end users, enabling an end user to convert a previewed data stream processing instruction set to a deployed data stream processing instruction set simply by modifying a source of the data stream processing instruction set to point to a data stream.

FIG. 1 illustrates an example of a computing system 100 in which aspects of the present disclosure can be implemented. In FIG. 1, system 100 illustratively implements a data intake and query system 110 configured to facilitate both stream data processing and batch queries against data sets. The data intake and query system 110 of FIG. 1 may represent a simplified example of a general data intake and query system, such as the data intake and query systems described below with reference to FIGS. 6-AE. Accordingly, it should be understood that embodiments described with reference to FIG. 1 may additionally or alternatively be implemented on the data intake and query systems described below. For example, the embodiments described with reference to FIG. 1 may additionally or alternatively be implemented on the data intake and query system of FIG. 10.

In FIG. 1, the data intake and query system 110 illustratively operates to collect, index, and enable searching of machine-generated data, such as for purposes of data analytics. The data intake and query system 110 further operates to enable data processing against streams of data, independent of or prior to collection, indexing and searching of that data. For example, the data intake and query system 110 can provide a stream data processing system 112 configured to conduct stream data processing on a data stream provided by a data source 102 and to output a resulting stream to a data storage system 114, where that stream can be stored as a data set queryable by a batch search system 118. The data intake and query system 118 can further provide a user interface system 116 enabling interaction with the stream data processing system 112, data storage system 114, and batch search system 118. For example, a client may utilize a computing device 104 with a network access application 106 (e.g., a web browser) to interface with the data intake and query system 110 through the user interface system 116 to configure data stream processing on the stream data processing system 112, to access data in the data storage system 114, to conduct batch searches using the batch search system 118, or the like.

Each data source 102 illustratively corresponds to a computing device that generates machine data, such as logs, metrics, or the like. For example, such machine data may be generated during operation of the data source 102 for other purposes (e.g., to implement other functionality of the computing system 100).

The stream data processing system 112 illustratively corresponds to one or more computing devices that obtain data from the data sources 102, manipulate the data according to one or more defined sets of data stream processing instructions, and output the data to a destination, such as the data storage system 114. Because data from data sources 102 in FIG. 1 is unbounded—that is, it has no pre-defined size or termination point—the data can be considered a data stream. Similarly, data output by the stream data processing system 112 can be considered a data stream. Accordingly, the manipulations of the stream data processing system are discussed here as stream data processing. In one embodiment, the stream data processing system 112 implements multiple sets of processing instructions, each associated with intaking a particular set of data (e.g., from one or more specified data sources 102), implementing one or more manipulations (e.g., including filtering, modifying, routing, or otherwise manipulating the data), and outputting the data (e.g., to one or more specified destinations). Each instruction set may be in some cases be referred to as a "pipeline." For example, each instruction set may be logically viewed as a pipeline through which data moves and is manipulated prior to being output.

One skilled in the art will recognize that data streams differ from defined or pre-existing data sets (referred to herein as "data sets" for brevity). For example, data streams unlike data sets typically have no fixed size or termination, but can continue (potentially indefinitely) as data is produced. Data streams are sometimes described as "data in motion," whereas data sets are sometimes described as "data at rest." Processing for data sets and data streams can differ. For example, while batch processing of a data set may apply statistical techniques (such as averages, medians, distributions, etc.) to the fixed set, stream data processing may apply such techniques to windows within the stream. Batch processing of data sets may be associated with more latency between data generation and processing than stream processing. For example, batch processing may occur periodically (e.g., every x minutes, hours, etc.), processing a past portion of data created by a data source, with each result being delayed by up to the periodicity. Stream processing may occur continuously, enabling rapid results to be produced. Batch processing of a data set can be preferably for some tasks, such as historical analysis of existing data, while stream data processing can be preferably for other tasks, such as continuous monitoring.

The stream data processing system 112 can output data streams to a variety of destinations. For example, where the batch search system 118 provides for indexing of data, the stream data processing system 112 may output a data stream to the batch search system 118 for indexing as a data set, as described in more detail below. As another example, the user interface system 116 may enable real-time review of data processing by the stream data processing system 112, and as such the stream data processing system 112 may output a data stream to the user interface system 116 for display on a computing device 104. As yet another example, the stream data processing system 112 may output a data stream to the data storage system 114 for storage.

The data storage system 114 illustratively corresponds to a network-accessible storage system, a variety of which may be used. Illustratively, the data storage system 114 stores data obtained from the stream data processing system 112. For example, the data storage system 114 may bucketize data obtained from the stream data processing system 112 to create data sets accessible by the batch search system 118, such as by storing each n period of a data stream as a distinct bucket of data. While FIG. 1 depicts the data storage system 114 in communication with the stream data processing system 112 (e.g., via a network on the data intake and query system 110), the data storage system 114 may additionally or alternatively obtain data from data sources 102 without use of the stream data processing system 112.

The batch search system 118 illustratively corresponds to one or more computing devices that conduct batch searches or other batch processing against existing data sets. For example, the batch search system 118 may include an indexing and search system as described below (e.g., the indexing system 620 and search system 660 of FIG. 6). The batch search system 118 may be configured to accept batch operations, such as queries, from a computing device 104 (e.g., via the user interface system 116) and apply such queries to a data set, which may for example be stored within the data storage system 114. Such queries may retrieve relevant data, manipulate the data according to one or more manipulations (e.g., filtering, routing, or transforming the data), and output results, such as by creating a new data set on the data storage system 114, presenting results to the computing device 104 via the user interface system 116, or the like.

As noted above, the user interface system 116 illustratively represents one or more computing devices providing interfaces for the data intake and query system 110. For example, the user interface system 116 may provide command line interfaces (CLIs), graphical user interfaces (GUIs), application programming interfaces (APIs), or the like that are accessible to computing devices 104 over a network to interact with the data intake and query system 110. In one embodiment, the user interface system 116 includes a web server configured to present web pages (e.g., as hypertext markup language, or "HTML", documents) to a computing device 104, which web pages provide an interface for interaction with the data intake and query system 110.

A computing device 104 can utilize a network accessible application 106 to access an interface provided by the user interface system 116 and thus interact with the data intake and query system 110. For example, the network access application 106 may represent a web browser that accesses web pages provided by the user interface system 116, which web pages enable a user of the computing device 104 to, e.g., browse and retrieve data in the data storage system 114, submit queries to the batch search system 118 and obtain results of such queries, or author data stream processing instruction sets ("pipelines") for deployment on the stream data processing system 112.

In accordance with embodiments of the present disclosure, a user using a computing device 104 to author data stream processing instruction sets may desire to preview the results of deploying such an instruction set to the stream data processing system 112. For example, the user may desire to view potential results of deployment of such an instruction set to the system 112 to verify that an output is as intended.

As noted above, streams generally represent "data in motion." As such, deployment of an instruction set may have difficult-to-reverse side effects, such as movement of a cursor in a data source 102 that limits availability of already consumed data for re-processing, should an instruction set not function as desired. Embodiments of the present disclosure provide for side-effect-free previews of data stream processing instruction sets by providing such previews based on conversion of an instruction set to a batch query that can be applied to a data set associated with an input data stream for the instruction set. Illustratively, an end user may utilize a computing device 104 to author an instruction set for manipulating logs from a router within a computing network. Deploying the instruction set to the stream data processing system 112 and applying that set to logs (e.g., from a data source 102, which may be the router generating the logs) may result in consumption of those logs, limiting an ability to verify functionality of the instruction set before deployment. As such, embodiments of the present disclosure can enable an end user to preview such deployment by converting the instruction set into a query executable by the batch search system 118. The query can then be applied to an existing data set associated with the corresponding input data stream, such as a data set including sample router logs. Such a preview mechanism can enable the end user to preview operation of the instruction set without requiring deployment to the stream data processing system 112, and thus without incurring detrimental effects of such deployment. Moreover, such a preview mechanism can provide for deterministic preview operation, as the sample data can remain static regardless of when preview occurs. Thus, the end user may develop the instruction set over a relatively long period (e.g., during which data produced by the router may vary completely) without variance in output. This is in contrast to preview mechanisms that rely on data read from a stream, where such data may vary over time.

Figure 2:
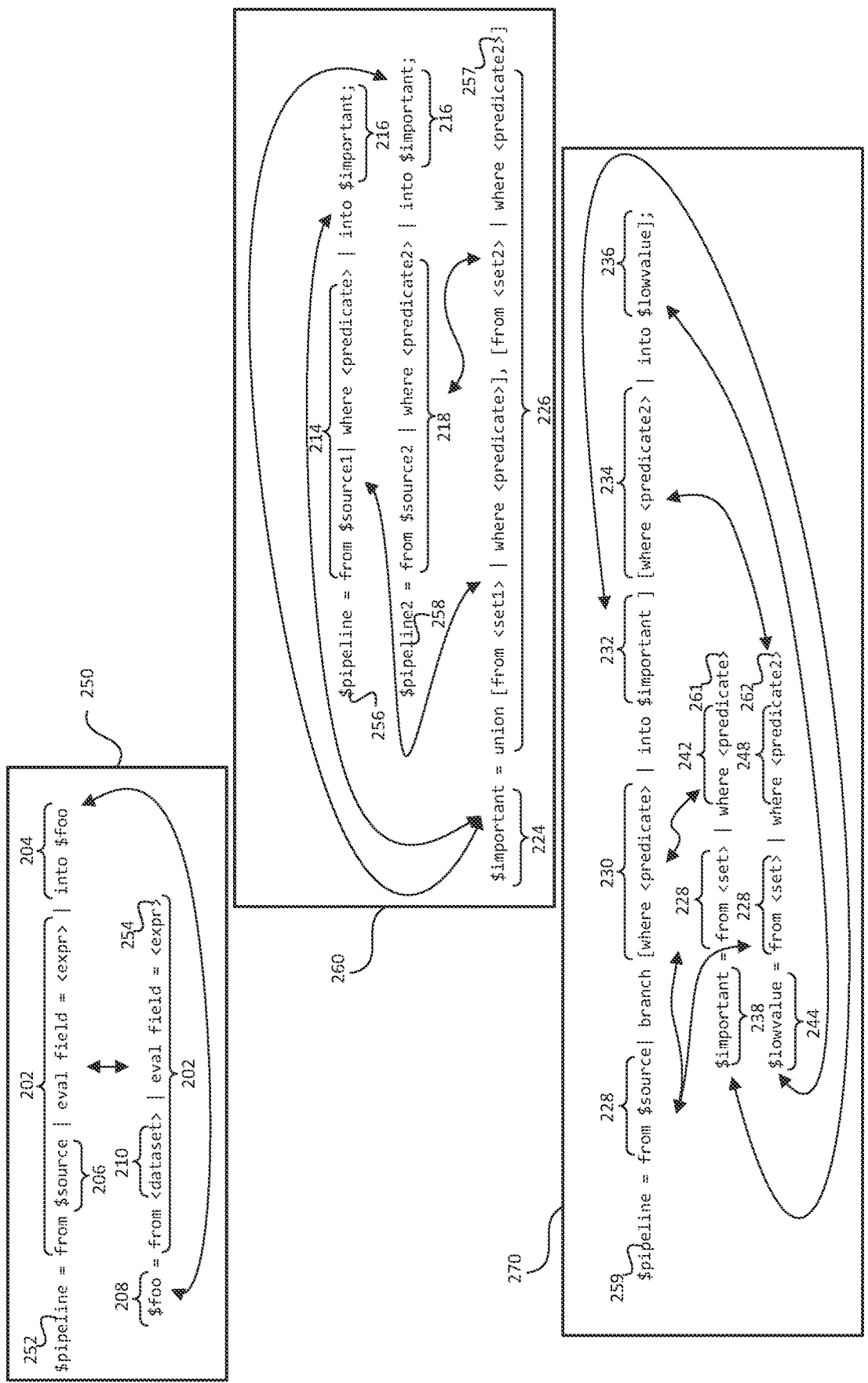
FIG. 2 depicts illustrative conversions of data stream processing instruction sets into batch queries to facilitate previews of data stream processing instruction sets.

With reference to FIG. 2, illustrative processes for conversion of a data stream processing instruction set ("pipeline") will be described. The processes discussed in connection with FIG. 2 may be implemented, for example, by the user interface system 116. Illustratively, on submission of a request to preview operation of a data processing instruction set, the user interface system 116 may operate to convert the instruction set to a batch query and instruct the batch search system 118 to execute the batch query against a data set, such as a set stored in the data storage system 114. The user interface system 116 may then return results of the batch query to the requesting device (e.g., computing device 104) as preview results for the instruction set.

To better describe conversion of data stream processing instruction sets to batch queries, FIG. 2 depicts three example instruction sets and three associated batch queries. The example instruction sets and batch queries in FIG. 2 are illustratively authored in a textual query language enabling authorship of both instruction sets and batch queries. However, in some embodiments instruction sets and queries may be authored in different manners. For example, an instruction set may be authored in a first language, whereas batch queries are authored in a second language, and conversion may include converting a representation of the instructions set in the first language into a representation of a batch query in a second language. As another example, an instruction set may be graphically authored while batch queries are textually authored, and conversion may include converting a graphical representation of the instruction set into a textual representation of the batch query. The user interface system 116 can be configured to conduct such conversion, such as by maintaining a conversion data set associating operations in one language or representation to equivalent or analogous languages in another language or representation.

In general, conversion of data stream processing instruction sets to batch queries can depend at least partly on data paths within the instruction sets. Accordingly, the examples shown in FIG. 2 include conversion 250 of a first instructions set 252 with a linear path into a corresponding batch query 254, conversion 260 of a second instruction set 256 and third instruction set 258 that both write to a common destination (thus representing a merging data path) with a into a corresponding batch query 257, and conversion 270 of a fourth instruction set 259 including a forked data path into two corresponding batch queries 261 and 262. Each conversion is discussed in turn.

With reference to conversion 250, the instruction set 252 includes specification of a source data stream variable 206, one or more data manipulations, and a destination data stream variable 204. Accordingly, deployment of the instruction set 252 (e.g., to stream data processing system 112) may cause data items to be read from a source data stream specified by the variable 206, manipulated according to the manipulations, and written to a destination data stream specified by the variable 204. The data path for data written to the destination data stream is thus shown as element 202, including reading data from a source and manipulating the data according to specified manipulations.

As discussed above, it can be desirable to convert the instruction set 252 into a corresponding batch query that, when executed against a data set, implements the same or analogous manipulations as the instruction set 252. An example converted query is shown as batch query 254 in FIG. 2. As can be seen, batch query 254 includes the same data path 202 prior to the destination data stream 204 as the instruction set 252, with the exception that the source variable 206 is replaced with a source data set 210. Source data set 210 illustratively points to an existing data set, such as one stored on the data storage system 114. Note that while variable 206 is replaced with a specific data set 210 in FIG. 2, such replacement need not occur by modification of the batch query 254, but may alternatively occur by modifying a value of the variable 206 to point to the data source. Because the data path 202 prior to the destination data stream 204 in the batch query 254 is the same as in the instruction set 252 (with the exception of potential modification to the source), data manipulated according to the query 254 can be expected to be manipulated in the same or an analogous manner to data manipulated according to the instruction set 252. Further, rather than including specification of a destination data stream 204, the batch query 254 specifies a result data set 208. Accordingly, data read from the source 210 in the batch query 254 will be modified according to manipulations in the data path 202 and written to the results data set 208. The results data set 208 is illustratively set to the same variable name as the destination data stream (e.g., "$foo"), thus causing a value of that variable to point to the results data set 208 rather than an output data stream. Accordingly, an end user may obtain the results of the batch query 254, once run, by reading from the specified variable name, potentially in the same manner that such a user would obtain results of the instruction set 252 once implemented. Interfaces and tools related to authoring instruction sets can thus be greatly simplified, enabling the same operations to manipulate both deployed instruction sets and previews of such sets by virtue of applied batch queries. For example, as noted above, in some embodiments a system can recognize implicit requests to preview an instruction set when a source variable (e.g., source variable 206) is not bound to an input data stream. Illustratively, deploying the instruction set 252 with the source variable 206 unbound or bound to a data set (e.g., data set 210), or with the destination variable unbound, may cause conversion of the instruction set 252 into the batch query 254 and execution of that batch query 254 against the data set 210, resulting in preview results being stored in the results data set 208.

Conversion 260 provides a second example of conversion between data stream processing instruction sets and corresponding batch queries. Specifically, conversion 260 depicts two instruction sets, sets 256 and 258, that write to a shared destination, specified as destination variable 216. The two instruction sets 256 and 258 thus represent a merged data path, such that data flowing through pipelines corresponding to each instruction set arrive at a common destination specified by the variable 216. To convert such instruction sets 256 and 258 into a corresponding batch query 257, the data intake and query system 110 can utilize a unioned query, as shown in FIG. 2. Specifically, the query 257 of FIG. 2 depicts a union operation that combines the data path 214 (prior to the destination variable 216) of instruction set 256 and the data path 218 (prior to the destination variable 216) of instruction set 258, as shown in query string 226. As in conversion 250, the source variables of the instruction sets 256 and 258 are shown as replaced with existing data sets ("set1" and "set2" in FIG. 2). In practice, replacement may alternatively occur by remapping respective source variables of the instruction sets 256 and 258 to these data sets. As in conversion 250, the result of the batch query 226 is stored in a results data set 224, which is illustratively set to the same variable name 216 as the destination data stream (e.g., "$important"), thus causing a value of that variable 216 to point to the results data set 224 rather than an output data stream. Accordingly, an end user may query the value of the variable 216 to obtain results either of deployment of the instruction sets 256 and 258 (when deployed) or of the batch query 226 (when executed as a preview operation for instruction sets 256 and 258).

Notably, the query 226 may vary based on a request from a user to preview operation of an instruction set. For example, a request to preview only the instruction set 256 may result in a batch query including only the data path 214 (and thus lacking a union operation), similarly to as discussed above with respect to conversion 250. Similarly, a request to preview only the instruction set 258 may result in a batch query including only the data path 218 (and thus lacking a union operation). As noted above, preview requests may occur explicitly or implicitly (e.g., by leaving source and/or destination variables in the instruction sets unbound).

Conversion 270 provides yet another example of conversion between data stream processing instruction sets and corresponding batch queries. In conversion 270 a single instruction set 259 is shown, which set 259 includes a branching (or forked) data path. Accordingly, instruction set 259 outputs to two destination data streams, designated by output variable 232 and output variable 236, respectively. The branching of the data path within the instruction set 259 is shown in FIG. 2 via the "branch" operation, such that operation 230 is within a first branch of the data path that outputs to a destination specified by variable 232 and such that operation 234 is within a second branch of the data path that outputs to a destination specified by variable 236. An initial portion 228 of the instruction set 259, corresponding to instructions to read from a source specified by a source variable, is shared between the data path branches. Due to the branching within the instruction set 259, conversion of the instruction set 259 results in two batch queries, shown as queries 261 and 262. Each of the queries 261 and 262 corresponds to a branch of the instruction set 259. Each includes the initial portion 228 of the instruction set 259, as shared between branches. As in prior examples, the source variable of the instruction set 259 is shown as replaced with an existing data set ("<set>" in FIG. 2). In practice, replacement may alternatively occur by remapping the source variable of the instruction set 259 to this data set. Each of the queries 261 and 262 further includes the respective branch of the instruction set 259 corresponding to the query. Specifically, in FIG. 2, the query 261 corresponds to a first branch of the instruction set 259, and thus includes operation 230. The query 262 corresponds to a second branch of the instruction set 259, and thus includes operation 234. When executed in conjunction, the two queries 261 and 262 thus implement logic equivalent to that of the instruction set 259, except that such logic is applied as a batch operation to a data set, rather than as a streaming operation against an input data stream. As in the conversions discussed above, result of the batch queries 261 and 262 are illustratively stored in results data sets 238 and 244, which are set to the variable names 232 and 236 specified in the instruction set 259. Accordingly, an end user may query the value of the variable names 232 and 236 to obtain results either of deployment of the instruction set 259 (when deployed) or of the batch queries 261 and 262 (when executed as a preview operation for instruction set 259).

The conversions described above may be combined in a variety of ways. For example, conversion of instruction set 258 and instruction set 259 may involve generation of a batch query combining (e.g., via union operation) the data path of instruction set 258 (prior to output to a destination) with a data path corresponding to a branch of instruction set 259 that pertains to the same output variable (e.g., operation 230), as well as generation of batch query 262, thus involving both a branching and merging operation. In some cases, an instruction set may include multiple branches, resulting in three or more queries to represent the set. Still further, three or more instruction sets may write to the same destination, resulting a batch query that combines data paths of each instruction set. Accordingly, any variety of instruction sets, including any variety of operations, including branching and merging operations, can be converted into one or more batch queries that, when executed against a data set, implement logic the same or analogous to the instruction sets when deployed by a data stream processing system.

Figure 3:
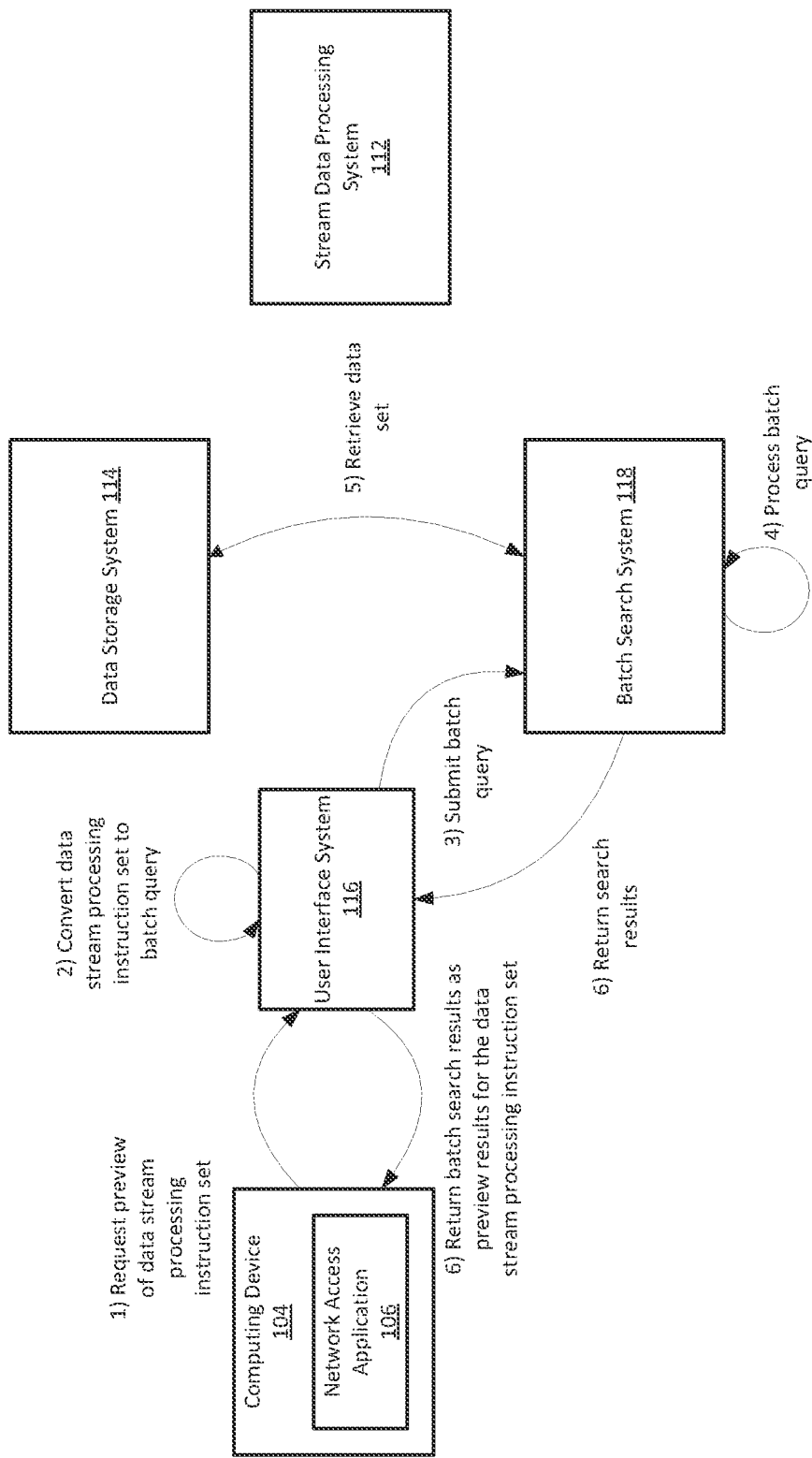
FIG. 3 depicts example interactions for providing a preview of the output of a data stream processing instruction set during operation based on conversion of the data stream processing instruction set into a batch query and execution of the batch query.

With reference to FIG. 3, illustratively interactions will be described for providing previews of data stream processing instruction sets by conversion to batch queries. As shown in FIG. 3, the interactions begin at (1), where a computing device 304 submits to the user interface system 116 a request to preview operation of a data stream processing instruction set. In one embodiment, the computing device 104 may submit the request explicitly. For example, an end user may interact with the user interface system 116 to author the data stream processing instruction set (e.g., via a user interface provided by the user interface system 116), and provide input requesting preview of operation of the data stream processing instruction set. In another embodiment, the request may be implicit. For example, an end user may request deployment of a data stream processing instruction set without specifying a source stream from which to input data or a destination stream to which to output data (e.g., without binding a variable in a data stream processing instruction set to a data stream, instead leaving the variable unbound or bound to a data set), which request the user interface system 116 can interpret as an implicit request to preview operation of the data stream processing instruction set. While the interactions of FIG. 3 are illustratively described with respect to a single data stream processing instruction set, preview operations may in some cases occur with respect to multiple data stream processing instruction sets, as discussed above with respect to FIG. 2.

As noted above, preview of operation of a data stream processing instruction set can include application of an equivalent or analogous batch query to a data set, such as a sample data set. In one instance, a request to preview operation of a data stream processing instruction set may specify the data set. For example, a source variable in a data stream processing instruction set may be bound to a data set, rather than a data stream, indicating that the batch query should be applied to the data set. In another instance, the request might not specify the data set. For example, the request may be placed due to a source variable for a data stream processing instruction set being unbound. In such an instance, the user interface system 116 can be configured to programmatically select a source data set to utilize to preview operation of a data stream processing instruction set. Illustratively, the data intake and query system 110 may maintain data associating types of input data streams to corresponding input data sets, and select an input data set based on a type of input data stream within the data stream processing instruction set and on such an association. For example, where the data stream processing instruction set operates with respect to firewall logs, the user interface system 116 can select a data set (e.g., stored in the data storage system 114) corresponding to firewall logs. In some instances, the sample data sets may be generated at the data intake and query system 110. For example, during past processing of data from a particular stream, the stream data processing system 112 may store a copy of data within a data stream during a given window of time as a sample data set for that stream, and associate the sample data set with the data stream. Thereafter, subsequent data stream processing instruction sets that operate with respect to the data set may have their operations previewed by application of an analogous batch query against the sample data set.

Accordingly, at (2), the user interface system 116 converts the data stream processing instruction set into an equivalent or analogous batch query. Conversion is described in more detail above with respect to FIG. 2. However, in brief, the user interface system 116 may identify data paths the data stream processing instruction set and generate one or more batch queries that, when executed against a data set, execute data manipulations equivalent or analogous to those of each data path.

Thereafter, at (3), the user interface system 116 submits the batch query to the batch search system 118, which processes the batch query at (4). Example interactions for processing of queries against data sets are discussed in more detail below (e.g., with reference to FIG. 8). However, in brief, the batch search system 118 may retrieve the data set to which the query is applied from the data storage system 114 and apply the manipulations specified within the batch query to data items within the data set to generate a set of search results conforming to the batch query.

At (5), the batch search system 118 returns results from processing the batch query to the user interface system 116. The user interface system 116, in turn, returns the search results to the computing device 104 as preview results for the data stream processing instruction set. In one instance, the user interface system 116 returns the results in response to the request to preview operation of the data stream processing instruction set. For example, a single request form the computing device 104 may be used to cause the interactions of FIG. 3. In another instance, the user interface system 116 returns the results in response to another request from the computing device 104, such as a request to read data assigned to a variable name within the data stream processing instruction set identifying an output data stream. For example, as discussed above with respect to FIG. 2, the user interface system 116 may convert the data stream processing instruction set into a query that writes a result data set using a name assigned, within the data stream processing instruction set, to an output data stream. Thus, a request to read the variable name, after previewing operation of the data stream processing instruction set, can result in the user interface system 116 presenting the results of the batch search. In this manner, the user interface system 116 is enabled to support a single type of request from the computing device 104—e.g., a request to read a variable name assigned, within the data stream processing instruction set, to an output data stream—and to provide in response either a data set (when the data stream processing instruction set is previewed) or an output data stream (when the data stream processing instruction set is deployed).

As noted above, because the batch query represents equivalent or analogous data manipulations to those in the data stream processing instruction set, the results of the batch query are illustrative of those that would be generated if the data stream processing instruction set were deployed on the stream data processing system 112 and the data items within the data set occurred on an input data stream to which the data stream processing instruction set was applied. Because the data items within the data set are illustratively representative of data items within such an input data stream, the search results thus provide a preview of operation of the data stream processing instruction set, if deployed. Notably, because the interactions of FIG. 3 do not require involvement of the stream data processing system 112, such preview does not modify operation of the stream data processing system 112 or effect input (or output) data streams. That is, the operations of FIG. 3 enable previews to operation of a data stream processing instruction set without causing side effects that may occur while reading from an input data stream or writing to an output data stream, which may otherwise occur during deployment of the data stream processing instruction set. Moreover, by use of a static data set, previews occurring via the operations of FIG. 3 can be made deterministic, such that development can occur over time periods without the data used to provide the preview changing, even if data on a given input data stream changes. These previews thus provide significant advantages over alternative approaches.

Figure 4:
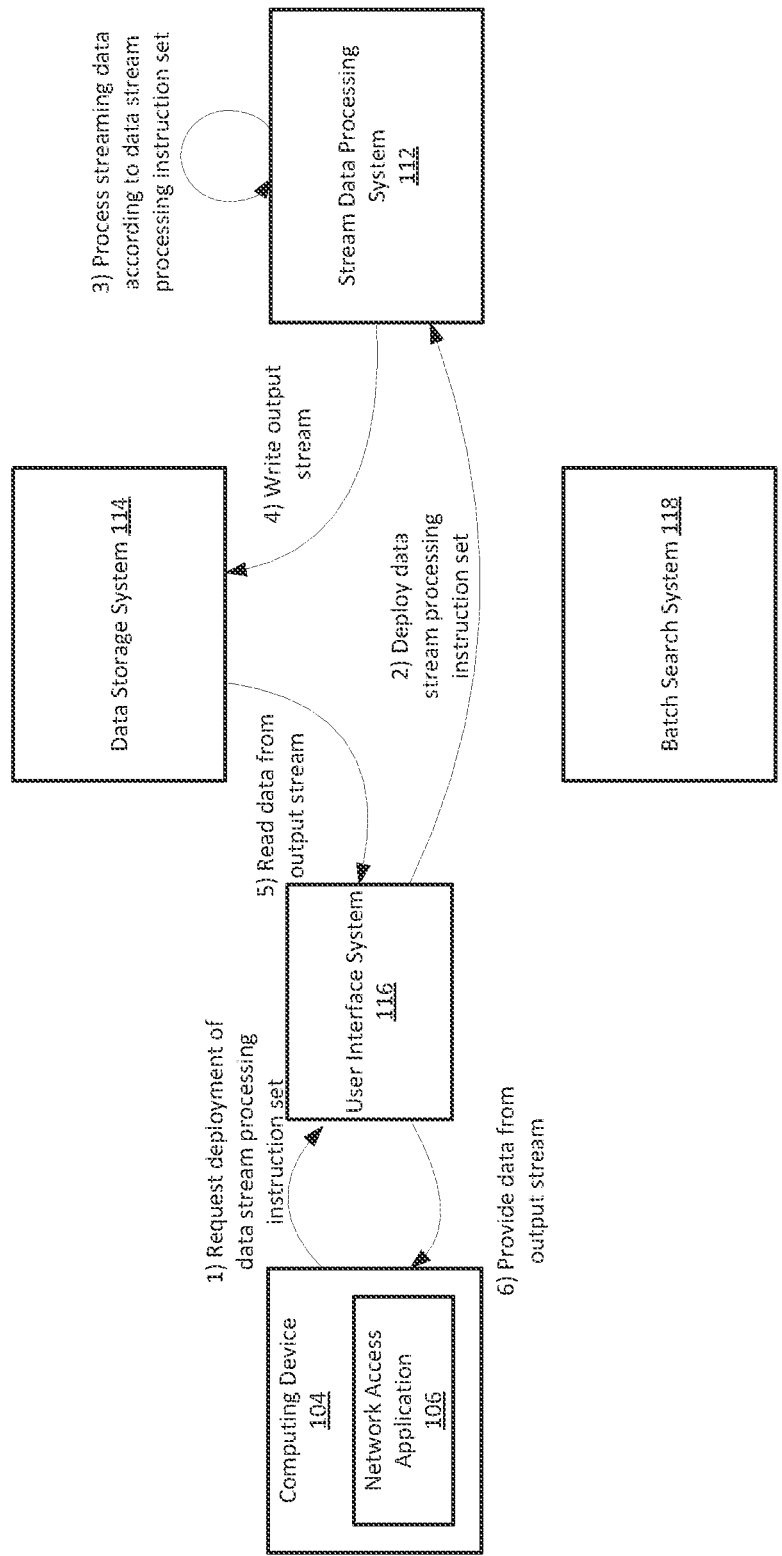
FIG. 4 depicts example interactions for deploying a data stream processing instruction set to a stream data processing system.

With reference to FIG. 4, example interactions will be described for deploying a data stream processing instruction set on a data intake and query system 110. The interactions of FIG. 4 may occur, for example, subsequent to those of FIG. 3. Illustratively, a user of a computing device 104 may utilize the interactions of FIG. 3 to preview operation of a data stream processing instruction set if deployed to the stream data processing system 112, and thereafter begin the interactions of FIG. 4 to deploy that data stream processing instruction set on the data intake and query system 110.

The interactions begin at (1), where the computing device 104 submits to the user interface system 116 a request to deploy the data stream processing instruction set. Illustratively, the computing device 104 may display to an end user an interface (e.g., a web page) enabling authoring of the data stream processing instruction set and submission of a request to deploy the data stream processing instruction set. The request illustratively specifies an input data stream associated with the data stream processing instruction set and an output data stream. For purposes of illustration, it will be assumed that the input data stream is a data stream available to the stream data processing system 112 (e.g., from a data source 102), and that the output data stream is written to the data storage system 114 as one or more data sets.

Accordingly, at (2), the user interface system 116 submits instructions to the stream data processing system 112 to deploy the data stream processing instruction set. The stream data processing system 112 thus, at (3), processes the input data stream, as specified in the data stream processing instruction set, to generate an output data stream. For example, the stream data processing system 112 may continuously obtain data items within the input data stream, manipulate the data items according to the data stream processing instruction set (e.g., including filtering, transforming, or manipulating the data items), and generate an output data stream including the results of such manipulations. In FIG. 4, the output data stream is written to the data storage system 114. However, the output data stream may be additionally or alternatively provided to other destinations, such as the batch search system 118, the computing device 104, etc.

While FIG. 4 is described with respect to a single input data stream and a single output data stream, a data stream processing instruction set may read from multiple input data streams, write to multiple output data streams, or both. Moreover, while FIG. 4 is described with respect to deployment of a single data stream processing instruction set, the data intake and storage system 110 may support simultaneous or concurrent deployment of multiple data stream processing instruction sets.

At (5), the user interface system 116 reads data from the output data stream, as stored in the data storage system 114. The user interface system 116 then provides this data to the computing device 104, such as for display to an end user. In one instance, interactions (5) and (6) occur in response to instructions to deploy a data stream processing instruction set. In anther instance, interactions (5) and (6) occur in response to instructions to monitor a data stream processing instruction set. For example, an end user of the computing device 104 may utilize an interface provided by the user interface system 116 to select the data stream processing instruction set, as deployed, and to request monitoring of the instruction set, such that data from the output data stream is displayed on the computing device 104.

Figure 5:
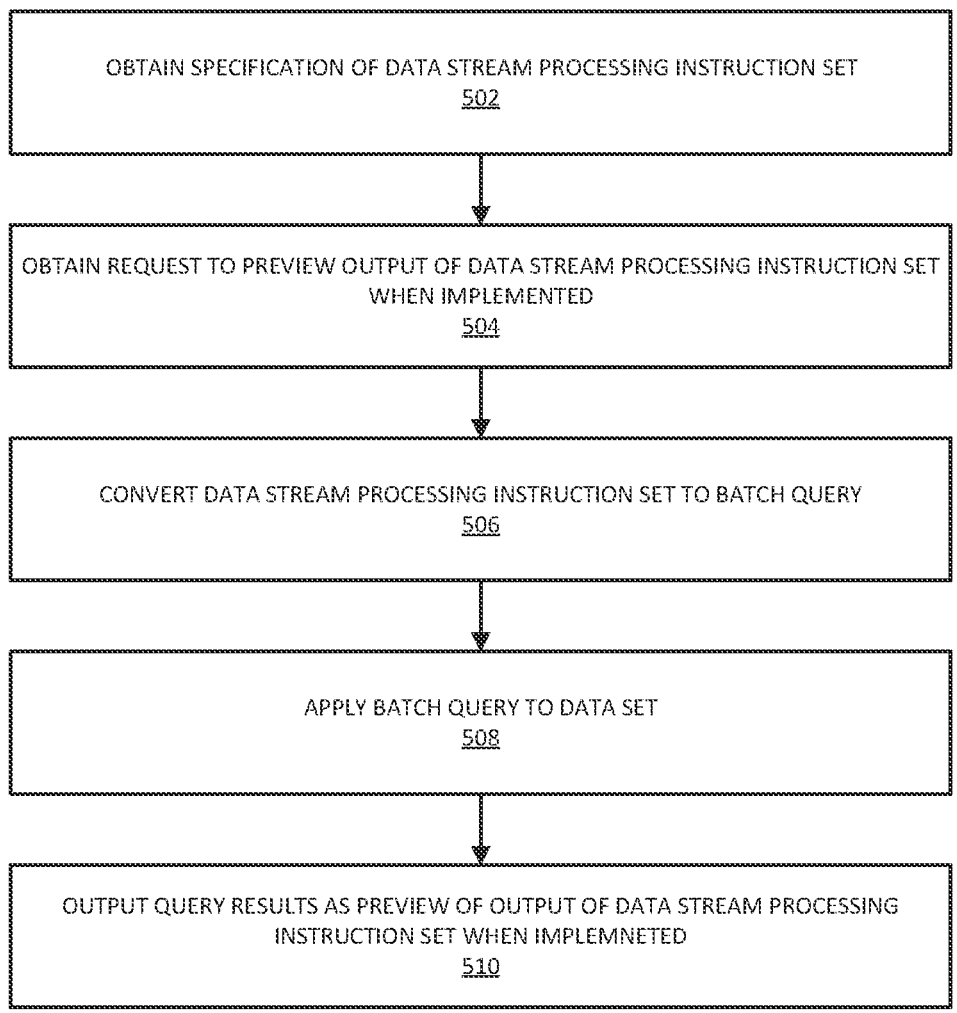
FIG. 5 is a flow chart depicting an illustrative routine for providing previews results for a data stream processing instruction set by conversion of the data stream processing instruction set into a batch query.

FIG. 5 is a flowchart illustrating an example routine 500 providing a preview of the output of a data stream processing instruction set when deployed to a stream data processing system, such as the stream data processing system 112 of FIG. 1. The routine 500 can be implemented, for example, by a computing device that comprises a processor and a non-transitory computer-readable medium. The non-transitory computer readable medium can be storing instructions that, when executed by the processor, can cause the processor to perform the operations of the illustrated routine 500. Alternatively or additionally, the routine 500 can be implemented using a non-transitory computer-readable medium storing instructions that, when executed by one or more processors, case the one or more processors to perform the operations of the routine 500 of FIG. 5. In one embodiment, the routine 500 is implemented by the data intake and query system 110 of FIG. 1.

The routine 500 begins at block 502, where the data intake and query system 110 obtains specification of a data stream processing instruction set. For example, an end user, using a computing device 104, may author a data stream processing instruction set by interaction with the user interface system 116. In one embodiment, the data stream processing instruction set is textually defined within a query language, which language may also be used to submit batch queries to the data intake and query system 110. In another embodiment, the data stream processing instruction set is otherwise defined, such as by graphical design of the data stream processing instruction set. As discussed above, the data stream processing instruction set illustratively instructs the stream data processing system 112 to obtain data items from one or more input data streams, manipulate the data items according to one or more manipulations (e.g., filters, routes, transformations, or the like), and output results to one or more output data streams. While FIG. 5 is discussed with respect to a single data stream processing instruction set, the routine 500 can additionally or alternatively be implemented with respect to multiple data stream processing instruction sets.

At block 504, the data intake and query system 110 obtains a request to preview output of the data stream processing instruction set when implemented. In one embodiment, the request is explicit. For example, a user may select a "preview" input in an interface provided by the data intake and query system 110, provide a "preview" command, or the like. In another embodiment, the request is implicit. For example, a user may submit a request to deploy the data stream processing instruction set without specifying an input data stream for the instruction set, such as by leaving a variable for input to the data stream processing instruction set unbound or binding that variable to an existing data set.

At block 506, the data intake and query system 110 facilitates preview of the data stream processing instruction set by conversion of the data stream processing instruction set into a batch query. Conversion of a data stream processing instruction set into a batch query is discussed in more detail above. However, in brief, conversion may include, for each data path within the data stream processing instruction set, generation of a batch query including data manipulations equivalent or analogous to data manipulations in the data path. Conversion may further include merging data paths, such as by generating a single query with a combination operator, such that outputs of two data paths writing to a common destination data stream are provided by the single query. Still further, conversion may include modifying each data path to obtain data from an existing data set, as needed. In one embodiment, the existing data set is specified by the user, for example via a variable value corresponding to the input. In another embodiment, the existing data set is programmatically selected by the data intake and query system 110. For example, the system 110 may maintain one or more data sets representing sample data for a particular type of input data stream, and may select a data set for use in the routine 500 based on a type of input data stream specified within the data stream processing instruction set. In one instance, the data set includes one or more items previously present within a given type of input data stream. For example, the data set may be raw data saved during a prior time window on an input data stream of the given type. As discussed above, conversion may further include modifying a data stream processing instruction set to output to a results data set, rather than writing to an output data stream. While the routine 500 is described with respect to a single query, a data stream processing instruction set may be converted into multiple queries, as discussed above.

At block 508, the data intake and query system 110 applies the batch query to the data set. For example, the data intake and query system 110 may submit the batch query to the batch search system 118, which may retrieve the data set and apply the manipulations specified within the batch query to data items within the data set to generate a set of search results conforming to the batch query. The results may illustratively be stored with an identifier corresponding to an identifier of an output data stream within the data stream processing instruction set. For example, where a data stream processing instruction set writes to a variable "$foo" (corresponding to an output data stream when the data stream processing instruction set is deployed), the data intake and query system 110 can store the results of the batch query as a value of the variable "$foo". In this manner, a user may obtain results of the batch query— which represent a preview of deployment of the data stream processing instruction set—in the same manner that they might otherwise read an output of the data stream processing instruction set when deployed.

At block 510, the data intake and query system 110 outputs the query results as a preview of the output of the data stream processing instruction set when implemented. In one embodiment, output may occur as a result of a request to preview operation of the data stream processing instruction set when deployed. For example, the data intake and query system 110 may output the results automatically in response to such a request. In another embodiment, output may occur as a result to read results of deployment or preview of the data stream processing instruction set. For example, output may occur in response to a request by a user to read a value of a variable identified, in the data stream processing instruction set, as an output data stream. As noted above, results of the batch query may be saved as a value of that variable to facilitate such reading by the end user.

Accordingly, by implementation of the routine 500, the data intake and query system 110 can facilitate previews for deployment of data stream processing instruction set by conversion to a batch query and application of the batch query to an existing data set. Because such previews are a result of batch queries, such previews can occur without the detrimental effects that might occur by actual deployment of the data stream processing instruction set to a stream data processing system.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
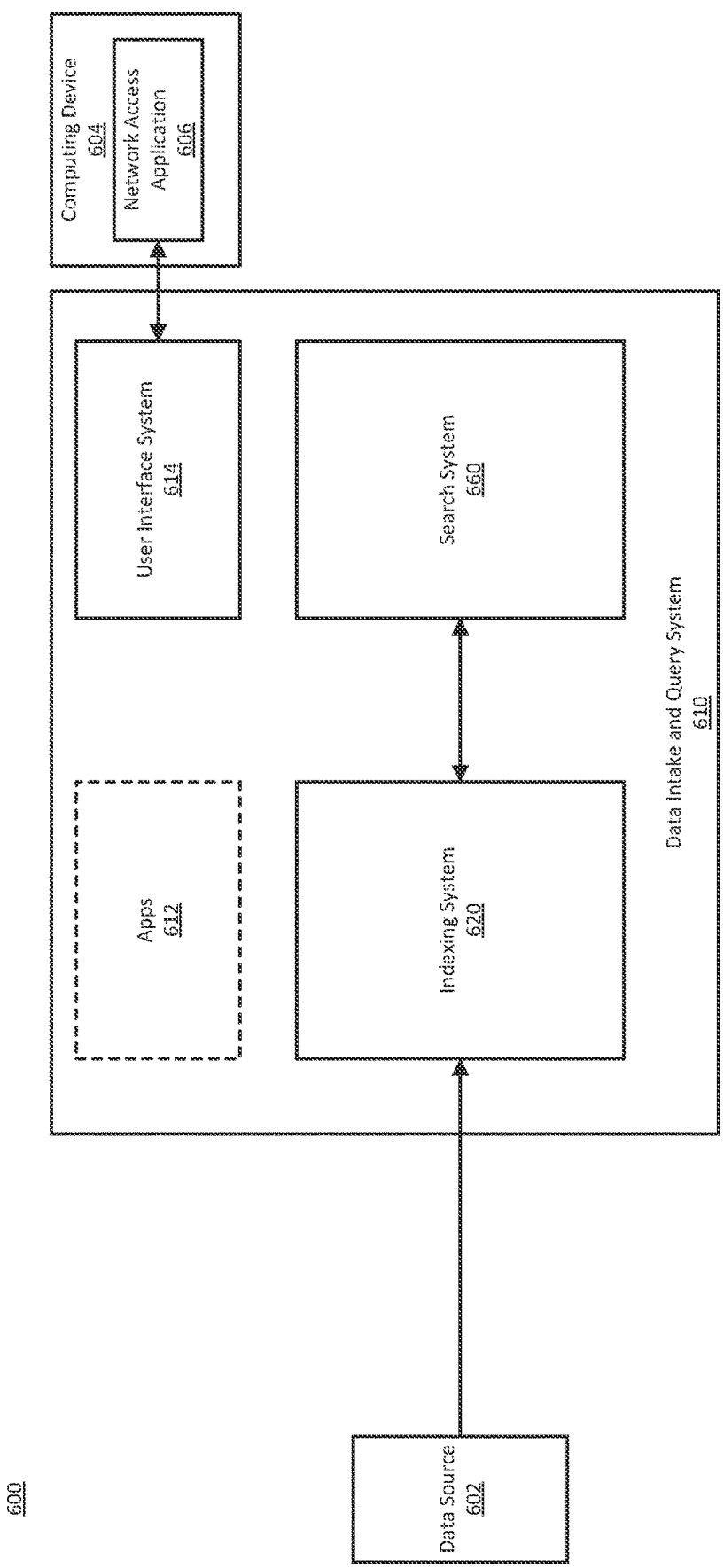
FIG. 6 is a block diagram illustrating an example computing environment that includes a data intake and query system.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes in FIG. 6, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can be executed on a single computing device, or execution of the program code can be distributed over multiple computing devices. For example, the program code can include instructions for both indexing and search components (which may be part of the indexing system 620 and/or the search system 660, respectively), which can be executed on a computing device that also provides the data source 602. As another example, the program code can be executed on one computing device, where execution of the program code provides both indexing and search components, while another copy of the program code executes on a second computing device that provides the data source 602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing system 620. As discussed in greater detail below, the search system 660 enables users associated with the computing environment 600 (and possibly also other users) to navigate the data, generate reports, and visualize search results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries that are to be processed by the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, such as a web browser, which can use a network interface of the client computing device 604 to communicate, over a network, with the user interface system 614 of the data intake and query system 610. The user interface system 614 can use the network access application 606 to generate user interfaces that enable a user to interact with the data intake and query system 610. A web browser is one example of a network access application. A shell tool can also be used as a network access application. In some examples, the data intake and query system 610 is an application executing on the computing device 604. In such examples, the network access application 606 can access the user interface system 614 without going over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
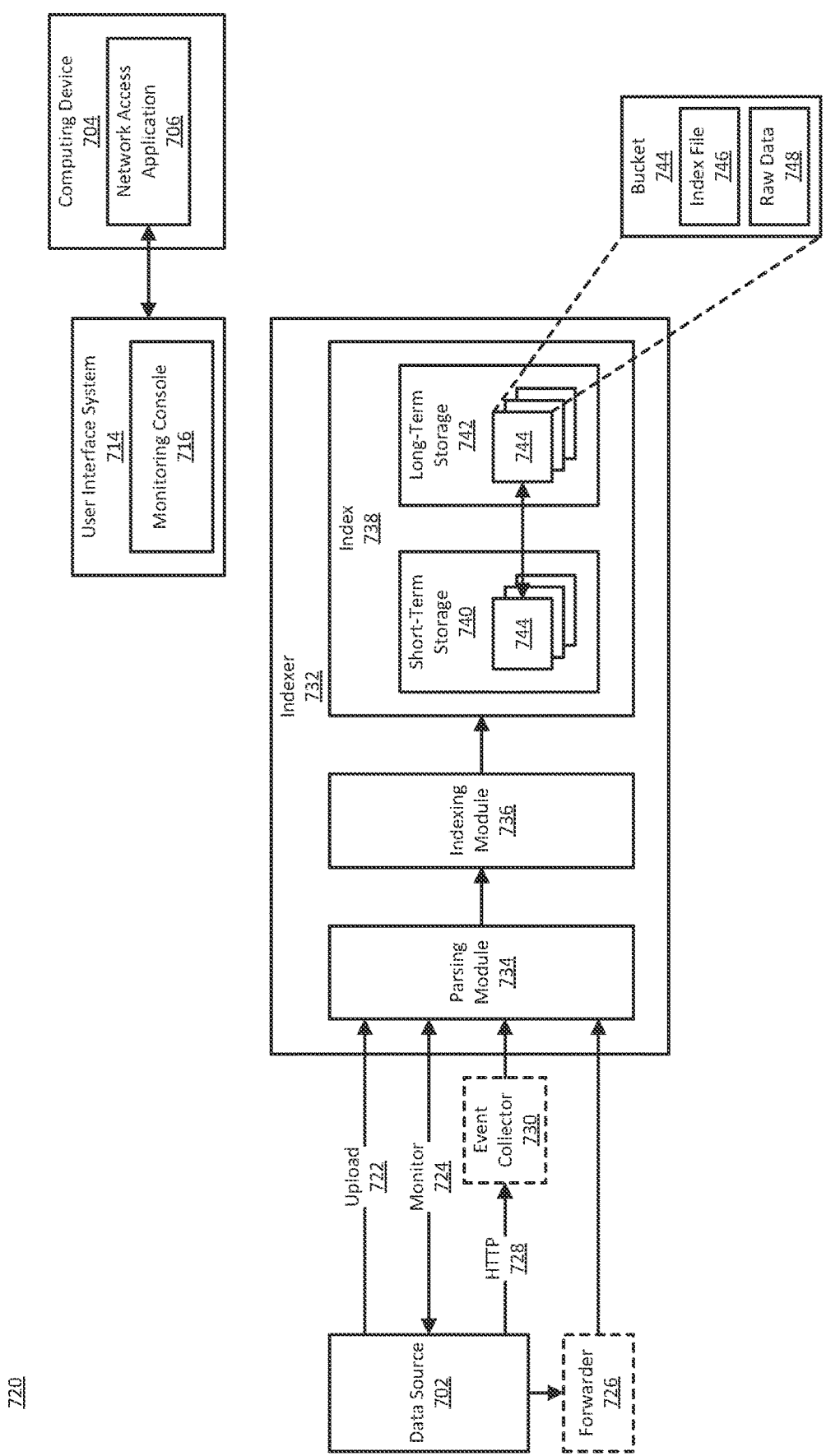
FIG. 7 is a block diagram illustrating in greater detail an example of an indexing system of a data intake and query system.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for data ingestion; configuring the indexer 732 to index the data from the data source 702; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device than the illustrated computing device 704.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can specify a file for uploading into the indexer 732. For example, the monitoring console 716 can include commands or an interface through which the user can specify where the file is located (e.g., on which computing device and/or in which directory of a file system) and the name of the file. The file may be located at the data source 702 or maybe on the computing device where the indexer 732 is executing. Once uploading is initiated, the indexer 732 processes the file, as discussed further below. Uploading is a manual process and occurs when instigated by a user. For automated data ingestion, the other ingestion methods are used.

The monitor 724 method enables the indexer 732 to monitor the data source 702 and continuously or periodically obtain data produced by the data source 702 for ingestion by the indexer 732. For example, using the monitoring console 716, a user can specify a file or directory for monitoring. In this example, the indexer 732 can execute a monitoring process that detects whenever the file or directory is modified and causes the file or directory contents to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the forwarder 726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data before sending the data to the indexer 732. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated in FIG. 7 to facilitate discussion, with the understanding that implementations with other components are possible to achieve the same functionality.

The parsing module 734 determines information about incoming event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field in the event data or using machine learning techniques applied to the event data.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields (key-value pairs) for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing component 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can manage more than one index and can manage indexes of different types. For example, the indexer 732 can manage event indexes, which impose minimal structure on stored data and can accommodate any type of data. As another example, the indexer 732 can manage metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing component 734 may add fields to event data and/or perform transformations on fields in the event data. Event data that has been altered in this way is referred to herein as enriched data. A raw data file 748 can include enriched data, in addition to or instead of raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may be moves from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the index 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
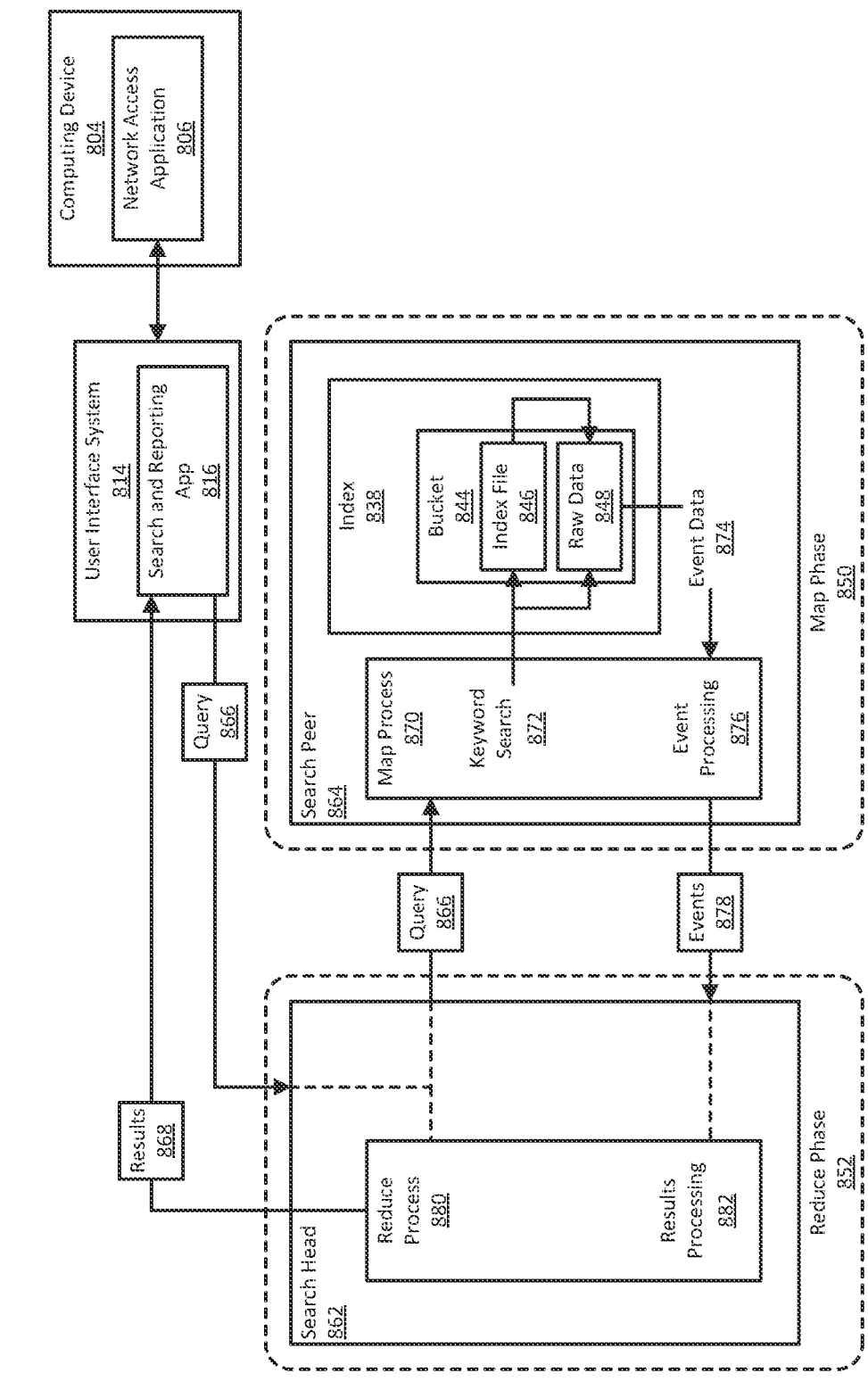
FIG. 8 is a block diagram illustrating in greater detail an example of the search system of a data intake and query system.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands or search terms that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("I" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data and are implanted using different hardware resources q. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 872 using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches a search term in the query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the received events. The results processing 882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

The reduce process 880 outputs the events found by the search query 866, as well as information about the events. The search head 862 transmits the events and the information about the events as search results 868, which are received by the search and reporting app 816. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Chloropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 868. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
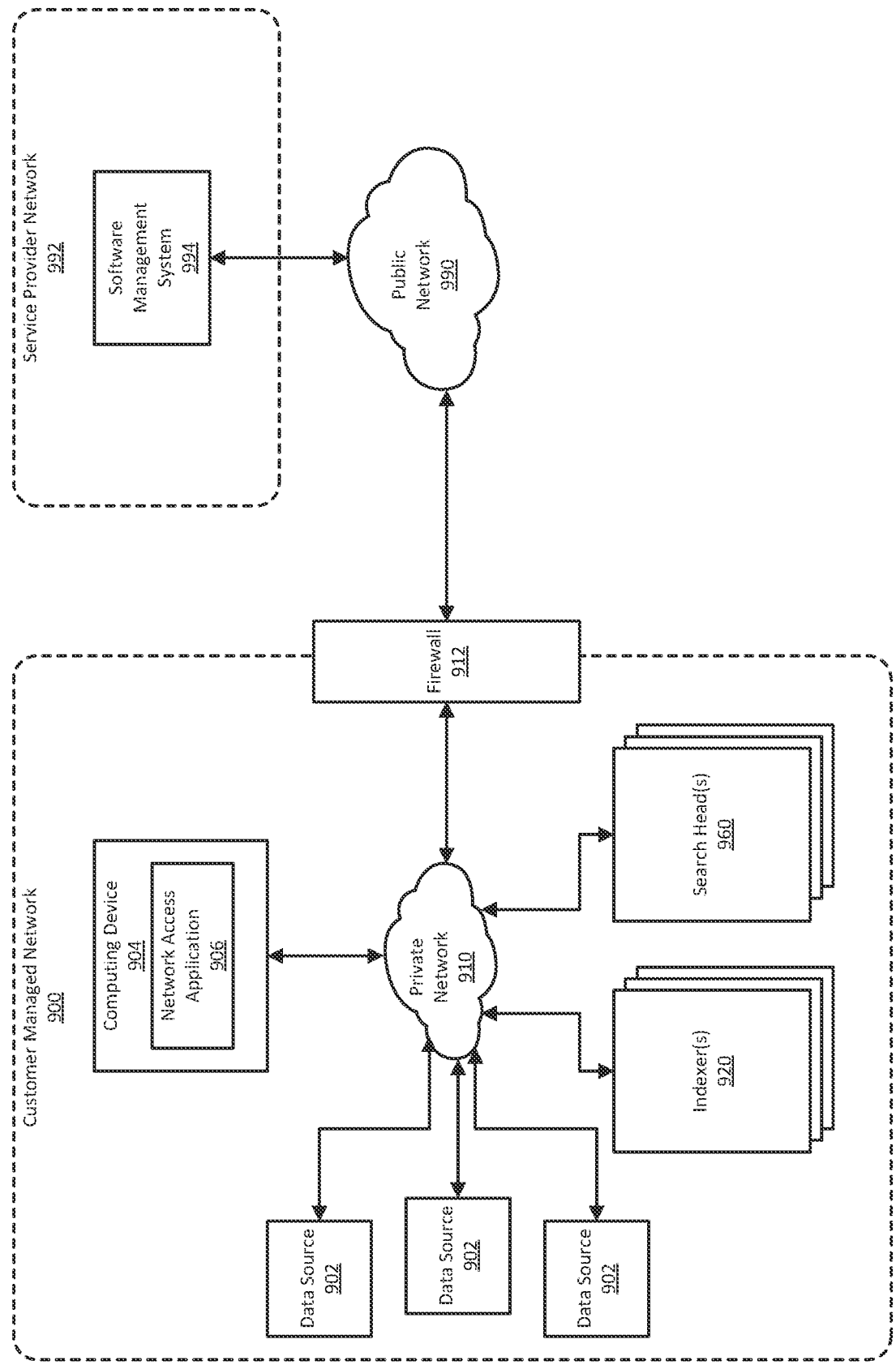
FIG. 9 illustrates an example of a self-managed network that includes a data intake and query system.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premise environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

In some implementations, a data intake and query system as described above may further include a stream data processing system. The stream data processing system can illustratively be configured to operate on the basis of data streams, rather than data sets, such as by manipulating the data streams according to one or more data sets of data processing instructions, sometimes referred to as pipelines.

In one example, the data intake and query system provides a unified query language that can be applied to both conduct batch queries and implement data stream processing instruction set. In another example, the data intake and query system provides graphical user interfaces to design data stream processing instruction set, and is configured to convert graphically designated data stream processing instruction sets into textual query language representations of the data stream processing instruction sets. In some cases, the data intake and query system may be configured to programmatically implement a given query command as a batch query, a data stream processing instruction set, or a combination thereof. For example, a query specifying a time range may be execute as a batch query if the time range is prior to a present time, as a data stream processing instruction set if the time range is at or past a present time, or as a combination if the range spans both past and present (e.g., with the batch query executed from the portion of the range in the past and the data stream processing instruction set executed on the portion of the range at or past a current time).

Figure 10:
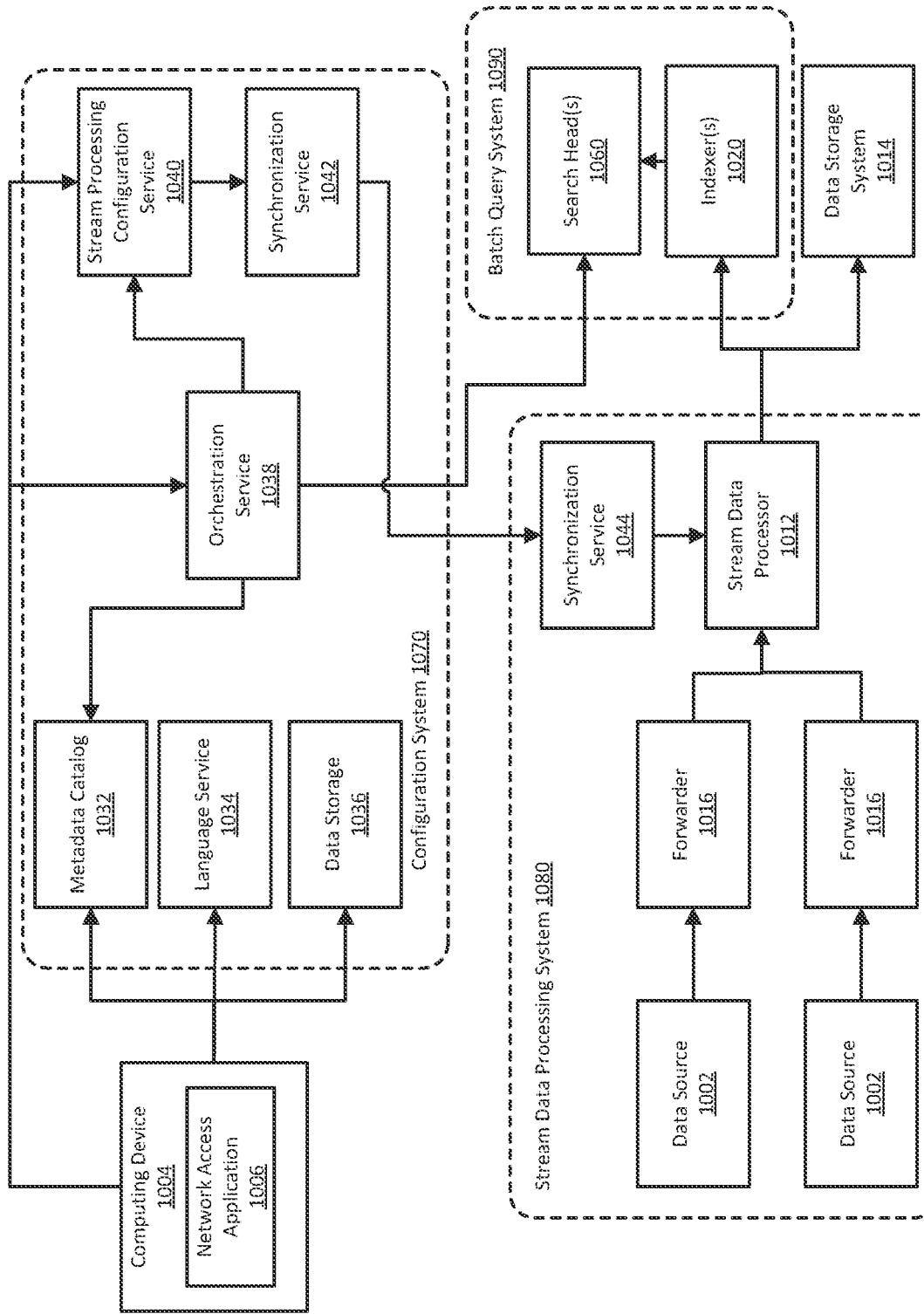
FIG. 10 depicts and implementation of a data intake and query system including a stream data processing system.

One example implementation of a data intake and query system including a stream data processing system is shown in FIG. 10. The data intake and query system of FIG. 10 includes a batch query system 1090, including a search head 1060 and an indexer 1020. The search head 1060 and indexer 1020 may operate similarly to the various search heads and indexers described above, such as the search heads 960 and indexers 920 of FIG. 9.

As shown in FIG. 10, the search head 1060 and indexer 1020 can (in addition or alternatively to obtaining from data sources 1002) obtain data from a stream data processor 1012 of a stream data processing system 1080. The stream data processor 1012, in turn, can be configured to obtain data from data sources 1002 as an input data stream, manipulate the data according to one or more data stream processing instruction set, and output the resulting data stream to indexers 1020 or other network-accessible storage, such as the data storage system 1014. For example, the stream data processing system 1080 can include one or more forwarders 1016 configured to obtain data from data sources 1002 and forward the data to the stream data processor 1012. In one example, the stream data processor 1012 conducts filtering prior to data moving to indexers 1020. Illustratively, the stream data processor 1012 may identify high value data and route such data to indexers 1020, while routing remaining data to the data storage system 1014. In another example, the stream data processor 1012 conducts other manipulations, such as re-formatting data, compressing data, or the like.

Illustratively, forwarders 1016 may be configured to support a variety of protocols, transmission formats, and data formats that may be used by various data sources 1002, and to forward such data to a stream data processor 1012 in a format acceptable to the process 1012. In some implementations, the stream data processor 1012 may obtain data directly from data sources 1002 and forwarders 1016 may be omitted.

The data intake and query system of FIG. 10 can further include a configuration system 1070 enabling user configuration of the stream data processing system 1080, the batch query system 1090, or both. Illustratively, a user may utilize a network access application 1006, such as a web browser, executing on a computing device 1004 to interact with the configuration system 1070 and appropriately configure the stream data processing system 1080, the batch query system 1090, or both. The configuration system 1070 can include a variety of elements facilitating such configuration. For example, the configuration system 1070 can include data storage 1036 for storage of information used by the network access application 1006, such as web pages renderable on the application 1006 to display interfaces facilitating configuration. The configuration system 1070 can further include a language service 1034 to facilitate creation of batch queries and/or pipelines implementable on the data intake and query system. For example, the language service 1034 may be configured to interpret textual queries as either or both batch queries and pipelines, and generate computer executable instructions executable by the respective stream data processing system 1080 and batch query system 1090 to implement the textual queries. The configuration system 1070 can further include a metadata catalog 1032 storing information regarding the data intake and query system, such as groups (e.g., buckets) of data stored on the batch query system 1090, identifiers for such groups, indexes of such groups, etc. and a configuration of the stream data processing system 1080, such as data stream processing instruction sets deployed to the system 1080 or metadata regarding such pipelines. Illustratively, the network access application 1006 may utilize metadata stored within the metadata catalog 1032 to enable a user of the computing device 1004 to browse data on the data intake and query system, form queries against that data, configure or reconfigure pipelines, and the like.

The configuration system 1070 shown in FIG. 10 further includes an orchestration service 1038 configured to orchestrate operation of the data intake and query system. For example, the orchestration service 1038 can be configured to determine whether to implement a query statement on the stream data processing system 1080, the batch query system 1090, or both (based, e.g., on a time range specified within the query, a source or destination specified in the query, etc.). The orchestration service 1038 can further maintain the metadata catalog 1032 based on results of such queries.

The configuration system 1070 in FIG. 10 further includes a stream processing configuration service 1040 enabling configuration of the stream data processing system 1080. For example, the stream processing configuration service 1040 may obtain configuration instructions from the computing device 1004 and/or from the orchestration service 1038 and generate a configuration for the stream data processing system 1080 from such instructions. For example, the stream processing configuration service 1040 may generate instructions to implement a data stream processing instruction set based on input from the computing device 1004 and/or the orchestration service 1038. The stream processing configuration service 1040 can illustratively interact with a synchronization service 1042 to provide configuration data to the stream data processing system 1080. For example, the synchronization service 1042 of the configuration system 1070 may interact with a synchronization service 1044 of the stream data processing system 1080 to synchronize a configuration of the stream data process 1012 with that generated at the stream processing configuration service 1040.

Accordingly, by use of the configuration system 1070, a user at a computing device 1004 may configure and utilize either or both the stream data processing system 1080 and batch query system 1090.

In one embodiment, each of the configuration system 1070, stream data processing system 1080, and batch query system 1090 is implemented within a distinct computing environment. For example, the configurations system 1070 may be implemented within a multi-tenant hosted computing environment (which hosted computing environment is sometimes referred to as a "cloud computing environment"). The stream data processing system 1080 may be implemented within a private computing environment, such as a private data center of an end user of the data intake and query system, which private computing environment may be referred to in some cases as an "on premises" environment. The batch query system 1090 may be implemented within a single tenanted hosted computing environment, such as a cloud-hosted environment dedicated to the end user associated with the batch query system 1090. Each of the elements of FIG. 10 may be in communication with one another via one or more networks, including private networks and/or public networks. Lines within FIG. 10 should be understood to depict illustrative logical interactions between elements; however, elements may interact in ways not depicted within FIG. 10.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   obtaining data representing a data stream processing instruction set, the data stream processing instruction set instructing a stream data processing system to read data from a streaming input, manipulate the data according to one or more manipulations specified in the data stream processing instruction set to result in manipulated data, and write the manipulated data to a streaming output;
   obtaining a request to preview results of the data stream processing instruction set when applied to the streaming input;
   generating a preview of the results of the data stream processing instruction set when applied to the streaming input by at least:
      converting the data stream processing instruction set into a batch query, wherein converting the data stream processing instruction set into a batch query, representing conversion of the data stream processing instruction set, comprises generating a batch query to read second data from an existing data set, manipulate the second data according to the one or more manipulations specified in the data stream processing instruction set to result in second manipulated data, and write the second manipulated data to a query results set;

applying the batch query, representing conversion of the data stream processing instruction set, to the existing data set to generate the query results set by reading second data from the existing data set, manipulating the second data according to the one or more manipulations specified in the data stream processing instruction set to result in second manipulated data, and writing the second manipulated data to the query results set; and outputting the query results set generated from applying the batch query, representing conversion of the data stream processing instruction set, to the existing data set as the preview of the results of the data stream processing instruction set when applied to the streaming input.

2. The computer-implemented method of claim 1, wherein the streaming output is designated by a streaming output variable, and wherein obtaining the request to preview results of the data stream processing instruction set comprises obtaining a request to deploy the data stream processing instruction set with the streaming output variable unbound.

3. The computer-implemented method of claim 1, wherein request to preview results of the data stream processing instruction set specifies the existing data set.

4. The computer-implemented method of claim 1 further comprising, when the request to preview results of the data stream processing instruction set does not specify the existing data set, selecting the existing data set using an association between the existing data set and the streaming input.

5. The computer-implemented method of claim 3, wherein the existing data set comprises data previously read from the streaming input.

6. The computer-implemented method of claim 1, wherein the data stream processing instruction set and the batch query are specified in a shared query language.

7. The computer-implemented method of claim 1, wherein the data stream processing instruction set and the batch query are specified in a shared query language, wherein a final command of the data stream processing instruction set specifies the streaming output, and wherein converting the data stream processing instruction set into a batch query comprises removing the final command of the data stream processing instruction set and saving a result as the batch query.

8. The computer-implemented method of claim 1, wherein the data stream processing instruction set and the batch query are specified in a common query language, and wherein converting the data stream processing instruction set into a batch query comprises replacing a reference to the streaming input in the data stream processing instruction set with a reference to the existing data set.

9. The computer-implemented method of claim 1, wherein the data stream processing instruction set further writes data to a second streaming output, wherein converting the data stream processing instruction set into the batch query comprises converting the data stream processing instruction set into at least two batch queries comprising a first batch query corresponding to the streaming output and a second batch query corresponding to the second streaming output, and wherein outputting the query results set as preview results of the data stream processing instruction set comprises outputting query results corresponding to a combination of results from the first batch query and results from the second batch query.

10. The computer-implemented method of claim 1 further comprising:

obtaining specification of a second data stream processing instruction set, the second data stream processing instruction set instructing the stream data processing system to write data to the streaming output; and obtaining a request to preview results of the second data stream processing instruction set;

wherein converting the data stream processing instruction set into the batch query comprises converting both the data stream processing instruction set and the second data stream processing instruction set into a single batch query; and wherein outputting the query results set as preview results of the data stream processing instruction set comprises outputting the query results as preview results of both the data stream processing instruction set and the second data stream processing instruction set.

11. The computer-implemented method of claim 1, wherein the method is implemented without reading data from the streaming input.

12. The computer-implemented method of claim 1, wherein the method is implemented without writing data to the streaming output.

13. The computer-implemented method of claim 1, wherein applying the batch query to the existing data set comprises submitting the batch query to a batch query processing system distinct from the stream data processing system.

14. The computer-implemented method of claim 1, wherein the streaming output is identified in the data stream processing instruction set with an output identifier, and wherein applying the batch query to the existing data set to generate the query results set comprises associating the query results set with the output identifier.

15. The computer-implemented method of claim 14, wherein outputting the query results set as preview results of the data stream processing instruction set is responsive to a request to read from the output identifier.

16. A system comprising:

a processor; and a non-transitory computer-readable medium having stored thereon instructions that, when executed by the processor, cause the processor to:

obtain data representing a data stream processing instruction set, the data stream processing instruction set instructing a stream data processing system to read data from a streaming input, manipulate the data according to one or more manipulations specified in the data stream processing instruction set to result in manipulated data, and write the manipulated data to a streaming output;

obtain a request to preview results of the data stream processing instruction set when applied to the streaming input; and generate a preview of the results of the data stream processing instruction set when applied to the streaming input by at least:

converting the data stream processing instruction set into a batch query, wherein converting the data stream processing instruction set into a batch query, representing conversion of the data stream processing instruction set, comprises generating a batch query to read second data from an existing data set, manipulate the second data according to the one or more manipulations specified in the data stream processing instruction set to result in second manipulated data, and write the second manipulated data to a query results set;

applying the batch query representing conversion of the data stream processing instruction set to the existing data set to generate the query results set by reading second data from the existing data set, manipulating the second data according to the one or more manipulations specified in the data stream processing instruction set to result in second manipulated data, and writing the second manipulated data to the query results set; and outputting the query results set generated from applying the batch query, representing conversion of the data stream processing instruction set, to the existing data set as preview of the results of the data stream processing instruction set when applied to the streaming input.

17. The system of claim 16, wherein the data stream processing instruction set and the batch query are specified in a common query language, and wherein to convert the data stream processing instruction set into the batch query, the instructions cause the processor to replace a reference to the streaming input in the data stream processing instruction set with a reference to the existing data set.

18. One or more non-transitory computer-readable media having stored thereon instructions that, when executed by a computing system including one or more processors, cause the computing system to:

obtain data representing a data stream processing instruction set, the data stream processing instruction set instructing a stream data processing system to read data from a streaming input, manipulate the data according to one or more manipulations specified in the data stream processing instruction set to result in manipulated data, and write the manipulated data to a streaming output;

obtain a request to preview results of the data stream processing instruction set when applied to the streaming input; and generate a preview of the results of the data stream processing instruction set when applied to the streaming input by at least:

converting the data stream processing instruction set into a batch query, wherein converting the data stream processing instruction set into a batch query, representing conversion of the data stream processing instruction set, comprises generating a batch query to read second data from an existing data set, manipulate the second data according to the one or more manipulations specified in the data stream processing instruction set to result in second manipulated data, and write the second manipulated data to a query results set;

applying the batch query representing conversion of the data stream processing instruction set to the existing data set to generate the query results set by reading second data from the existing data set, manipulating the second data according to the one or more manipulations specified in the data stream processing instruction set to result in second manipulated data, and writing the second manipulated data to the query results set; and outputting the query results set generated from applying the batch query, representing conversion of the data stream processing instruction set, to the existing data set as preview of the results of the data stream processing instruction set when applied to the streaming input.

19. The one or more non-transitory computer-readable media of claim 18, wherein the data stream processing instruction set and the batch query are specified in a common query language, and wherein to convert the data stream processing instruction set into the batch query, the instructions cause the computing system to replace a reference to the streaming input in the data stream processing instruction set with a reference to the existing data set.

* * * * *